(12) United States Patent
Cooper et al.

(10) Patent No.: US 10,273,183 B2
(45) Date of Patent: Apr. 30, 2019

(54) SODA-LIME-SILICA GLASS-CERAMIC

(71) Applicant: Owens-Brockway Glass Container Inc., Perrysburg, OH (US)

(72) Inventors: Scott P Cooper, Maumee, OH (US); Samuel Schuver, Painesville, OH (US); Carol A Click, Corning, NY (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 15/650,441

(22) Filed: Jul. 14, 2017

(65) Prior Publication Data

US 2019/0016629 A1 Jan. 17, 2019

(51) Int. Cl.
| | | |
|---|---|---|
| *C03C 10/00* | (2006.01) | |
| *C03C 3/078* | (2006.01) | |
| *C03C 4/20* | (2006.01) | |
| *B65D 1/02* | (2006.01) | |

(52) U.S. Cl.
CPC ........ *C03C 10/0009* (2013.01); *B65D 1/0207* (2013.01); *C03C 3/078* (2013.01); *C03C 4/20* (2013.01)

(58) Field of Classification Search
CPC .......................... C03C 10/00; C03C 10/0009
See application file for complete search history.

(56) References Cited

U.S. PATENT DOCUMENTS

| | | | |
|---|---|---|---|
| 2,920,971 A | 1/1960 | Stookey | |
| 3,054,686 A | 9/1962 | Hagedorn | |
| 3,458,330 A | 7/1969 | Tryggve | |
| 3,625,718 A | 12/1971 | Petticrew | |
| 3,779,856 A | 12/1973 | Pirooz | |
| 3,834,911 A | 9/1974 | Hammel | |
| 3,922,155 A * | 11/1975 | Broemer | C03C 21/00 65/33.3 |
| 4,100,001 A | 7/1978 | Franklin | |
| 5,565,388 A | 10/1996 | Krumwiede et al. | |
| 5,681,872 A * | 10/1997 | Erbe | A61B 17/866 106/35 |
| 5,914,356 A * | 6/1999 | Erbe | A61K 6/083 106/35 |
| 5,981,412 A * | 11/1999 | Hench | A61L 27/025 106/35 |

(Continued)

FOREIGN PATENT DOCUMENTS

| | | |
|---|---|---|
| JP | 3170593 B2 | 5/2001 |
| WO | 03050051 A1 | 6/2003 |

OTHER PUBLICATIONS

"New large grain, highly crystalline, transparent glass-ceramics", Thiana Berthier, et al., Journal of Non-Crystalline Solids, 354 (2008) 1721-1730.

(Continued)

*Primary Examiner* — Noah S Wiese

(57) ABSTRACT

A soda-lime-silica glass-ceramic article having an amorphous matrix phase and a crystalline phase is disclosed along with a method of manufacturing a soda-lime-silica glass-ceramic article from a parent glass composition comprising 47-63 mol % $SiO_2$, 15-22 mol % $Na_2O$, and 18-36 mol % CaO. The crystalline phase of the glass-ceramic article has a higher concentration of sodium (Na) than that of the amorphous matrix phase.

10 Claims, 4 Drawing Sheets

(56) References Cited

U.S. PATENT DOCUMENTS

| | | | |
|---|---|---|---|
| 6,130,178 | A | 10/2000 | Andrus et al. |
| 6,537,626 | B1 | 3/2003 | Spallek et al. |
| 7,141,520 | B2* | 11/2006 | Zimmer ............... A61K 8/25 501/5 |
| 7,166,549 | B2 | 1/2007 | Fechner et al. |
| 7,250,174 | B2* | 7/2007 | Lee ..................... A61K 8/22 424/400 |
| 8,828,896 | B2 | 9/2014 | Bogaerts et al. |
| 8,853,109 | B2 | 10/2014 | Bogaerts et al. |
| 2004/0167006 | A1 | 8/2004 | Apel et al. |
| 2005/0119105 | A1 | 6/2005 | Zimmer et al. |
| 2010/0015244 | A1* | 1/2010 | Jain ..................... A61L 27/10 424/602 |
| 2012/0132269 | A1 | 5/2012 | Hickman et al. |
| 2012/0132282 | A1 | 5/2012 | Aitken et al. |
| 2012/0202676 | A1* | 8/2012 | Bogaerts ............... C03C 3/078 501/32 |
| 2015/0099124 | A1 | 4/2015 | Beunet et al. |

OTHER PUBLICATIONS

"Continuous compositional changes of crystal and liquid during crystallization of a sodium calcium..", V.M.Fokin, et al.,Journal of Non-Clystalline Solids, 353 (2007) 2459-2468.

"Homogeneous nucleation versus glass transition temperature of silicate glasses", V.M. Fokin, et al., Journal of Non-Crystalline Solids, 321 (2003) 52-65.

"Mutant crystals in Na2O 2CaO 3SiO2 glasses" V. M. Fokin, et al., Journal of Non-Crystalline Solids, 331 (2003) 240-253.

"The effect of pre-existing crystals on the crystallization kinetics of a soda-lime-silica glass . . .", V.M. Fokin, et al., Journal of Non-Crystalline Solids 258 (1999) 180-186.

"Crystal Nucleation and Growth in a Na2O 2CaO 3SiO2 Glass", C.J.R. Gonzalez-Oliver, et al.,Journal of Non-Crystalline Solids 38 &39 (1980) 699-704, North Holland Publishing Co.

"Highly bioactive P2O5-Na2O-CaO-SiO2 glass-ceramics", Oscar Peitl, et al., Journal of Non-Crystalline Solids 292 (2001) 115-126.

"Crystallization of 1Na2O 2CaO 3SiO2 Glass Monitored by Electrical Conductivity Measurements" Ana Candida M. Rodrigues, et al.

"Nucleation and Crystallization of Na2O 2Ca0 3SiO2 Glass by Differential Thermal Analysis", Xiaojie J. Xu, et al., J. Am. Ceram Soc. 74 [5] 909-14 (1991).

"Surface crystallization kinetics in soda-lime-silica glasses", Edgar Dutra Zanotto, Journal of Non-Crystalline Solids 129 (1991) 183-190 North Holland.

PCT Search Report and Written Opinion, Int. Serial No. PCT/US2018/040558, Int. Filing Date: Jul. 2, 2018, Applicant: Owens-Brockway Glass Container Inc, dated Oct. 15, 2018.

* cited by examiner

SODA-LIME-SILICA GLASS-CERAMIC

The present disclosure is directed to glass-ceramics, and, more specifically, to soda-lime-silica glass-ceramics.

BACKGROUND AND SUMMARY OF THE DISCLOSURE

Soda-lime-silica glass, also referred to as soda-lime glass, is commonly used in the commercial production of hollow and flat glass articles, such as glass containers and windows, and is based on a $Na_2O$—$CaO$—$SiO_2$ ternary system. Relatively small amounts of other oxides may be added to adjust the properties of the glass for various purposes. For example, aluminum oxide ($Al_2O_3$), or alumina, is usually included in commercial soda-lime glass compositions to improve chemical resistance, regulate viscosity, and prevent devitrification of the glass. Commercial soda-lime glass compositions generally comprise, by weight, 70-75% silica ($SiO_2$), 11-15% soda ($Na_2O$), 6-12% lime (CaO), and 0.1-3% alumina ($Al_2O_3$).

Glass is commercially produced by melting a mixture of solid glass-forming materials known as a glass batch in a melting tank of a continuous glass furnace to produce a volume of molten glass known as a melt. Glass articles having a non-crystalline amorphous structure are produced from the melt by cooling the molten glass along a temperature profile that is calculated to avoid nucleation and crystal growth within the glass. The unintentional and uncontrolled crystallization or devitrification of soda-lime glass is generally considered to be undesirable because it typically results in the heterogeneous formation of relatively coarse crystals of varying size, which can reduce the transparency and mechanical strength of the glass. Also, devitrification of conventional soda-lime glass compositions is known to produce devitrite ($Na_2O.3CaO.6SiO_2$), wollastonite ($CaO.SiO_2$), and/or quartz, cristobalite or tridymite ($SiO_2$) crystals within the glass, which reduces the chemical resistance of the residual glass phase by increasing the $Na_2O$ concentration therein.

Glass-ceramic materials, having a homogeneous distribution of fine-grained crystals throughout a residual amorphous phase, may be formed by the controlled crystallization or ceramization of a parent glass. In particular, glass articles may be formed from a parent glass composition and then intentionally transformed into glass-ceramic articles by heat treating the parent glass at a temperature above its glass transition temperature (Tg) for a sufficient amount of time for bulk nucleation to occur within the glass, followed by crystal growth. The resulting glass-ceramic articles may exhibit certain desirable and improved properties over that of the parent glass. For example, glass-ceramic articles may exhibit a higher viscosity vs. temperature profile and a lower coefficient of thermal expansion. In addition, the crystal grains in the glass-ceramic articles may inhibit crack propagation, which may result in increased strength.

A general object of the present disclosure, in accordance with one aspect of the disclosure, is to provide a soda-lime-silica parent glass composition that can be used to produce soda-lime-silica glass-ceramic articles having improved chemical resistance and fracture toughness, as compared to conventional soda-lime-silica glass.

The present disclosure embodies a number of aspects that can be implemented separately from or in combination with each other.

In accordance with one aspect of the disclosure, a body of a soda-lime-silica glass-ceramic container, which defines a shape of the container, comprises a soda-lime-silica glass-ceramic having an amorphous matrix phase and a crystalline phase. An overall chemical composition of the soda-lime-silica glass-ceramic comprises 47-63 mol % $SiO_2$, 15-22 mol % $Na_2O$, and 18-36 mol % CaO. The concentration of sodium in the crystalline phase is greater than the concentration of sodium in the amorphous matrix phase.

In accordance with another aspect of the disclosure, there is provided a method of manufacturing a soda-lime-silica glass-ceramic container in which a glass body is initially formed from a parent glass composition that comprises 47-63 mol % $SiO_2$, 15-22 mol % $Na_2O$, and 18-36 mol % CaO. The glass body is in the shape of a container and is subjected to a thermal treatment to promote bulk in situ crystallization of the glass body such that the glass body is transformed into a glass-ceramic body having an amorphous matrix phase and a crystalline phase homogeneously dispersed throughout the amorphous matrix phase.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Soda-lime-silica glass-ceramic articles—having a crystalline phase and an amorphous matrix phase—can be produced from a parent glass composition that is formulated to approximate a stoichiometric $1Na_2O.2CaO.3SiO_2$ system, and thus may be referred to as $NC_2S_3$ glass. Conventional soda-lime-silica glass compositions, on the other hand, are typically based upon a stoichiometric $1Na_2O.1CaO.6SiO_2$ system, and thus may be referred to as $NCS_6$ glass. Unlike conventional soda-lime-silica glass compositions, the presently disclosed parent glass composition can be formed into the shape of a glass article and transformed into a glass-ceramic article that exhibits sufficient strength and chemical resistance for use in packaging a variety of consumer products, including beverages and food. This may be attributed to the ability of the parent glass composition to undergo spontaneous homogeneous nucleation, wherein nuclei are formed with equal probability throughout a bulk of the glass, instead of along a pre-existing surface. In addition, partial crystallization of the parent glass composition results in the formation of a crystalline phase that is enriched in sodium (Na), as compared to the parent glass composition and as compared to the amorphous matrix phase or residual glass phase. Without intending to be bound by theory, it is believed that trapping a relatively high amount of sodium in the crystalline phase of the glass-ceramic decreases the quantity of sodium ions that are susceptible to leaching or release from the glass-ceramic under certain conditions, which improves the chemical resistance of the glass-ceramic.

Figure 1:
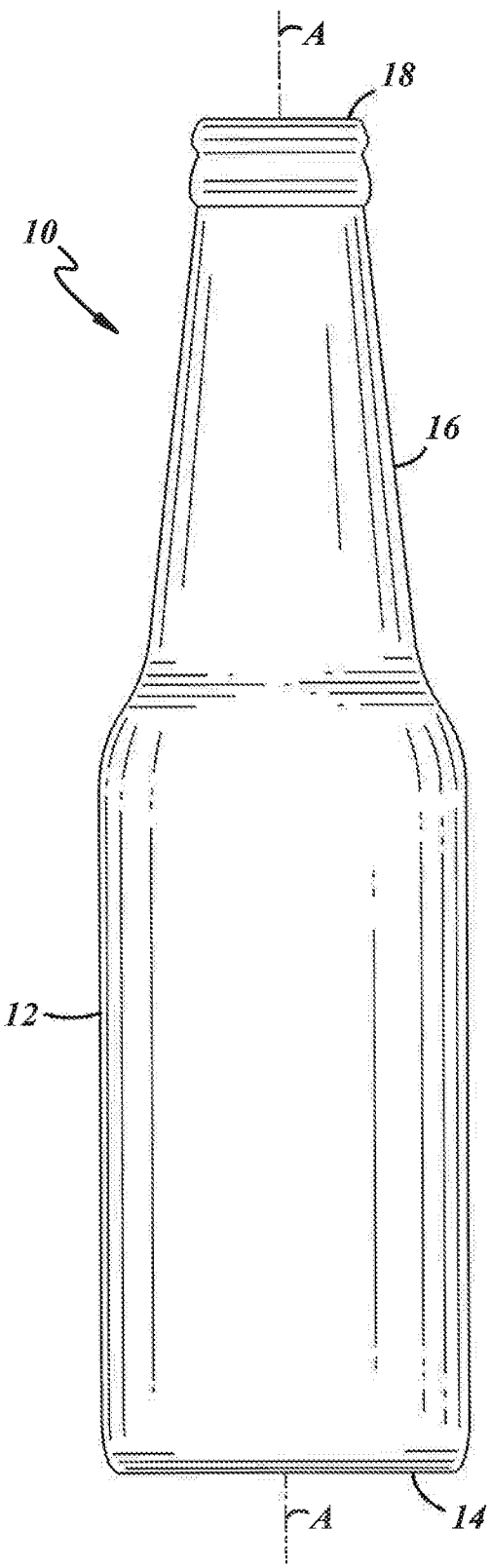
FIG. 1 is a side elevation of a soda-lime-silica glass-ceramic article, namely, a container.

FIG. 1 illustrates a soda-lime-silica glass-ceramic container 10 having a soda-lime-silica glass-ceramic body 12, in accordance with one embodiment of the present disclosure. In the illustrated embodiment, the body 12, which defines the shape of the container 10, has a longitudinal axis A. The body 12 provides the container 10 with a closed base 14 at one axial end, a circumferentially closed sidewall 16 extending in an axial direction from the closed base 14, and an open mouth 18 at another axial end, opposite the base 14. Accordingly, the body 12 is hollow. In one form, the sidewall 16 may have a thickness, measured from an interior surface to an exterior surface thereof, in the range of one millimeter to five millimeters, including all ranges and subranges therebetween.

The glass-ceramic body 12 is of unitary, one-piece construction and comprises a soda-lime-silica glass-ceramic material having two phases: a crystalline phase and an amorphous matrix phase. The crystalline phase may comprise 10 vol % to 70 vol % of the soda-lime-silica glass-ceramic body 12, with the amorphous matrix phase making up the remaining 30 vol % to 90 vol % of the glass-ceramic body 12, including all ranges and subranges between these ranges. The "volume percent" or "vol %" of a component within a mixture is determined by calculating the volume fraction of the component (by dividing the volume of the component by the volume of all of the components within the mixture) and multiplying by 100. In some specific embodiments, the volume fraction of the crystalline phase in the glass-ceramic body 12 may be greater than or equal to 0.10, 0.20, or 0.30; less than or equal to 0.70, 0.50, or 0.40; or between 0.10-0.70, 0.20-0.50, or 0.30-0.40.

The overall chemical composition of the soda-lime-silica glass-ceramic body 12, including the crystalline phase and the amorphous matrix phase, may comprise 47-63 mol % $SiO_2$, 15-22 mol % $Na_2O$, and 18-36 mol % CaO, including all ranges and subranges between these ranges. The "mole percent" or "mol %" of a component within a mixture is determined by calculating the mole fraction of the component (by dividing the number of moles of the component by the number of moles of all of the components within the mixture) and multiplying by 100. In one specific embodiment, the overall chemical composition of the soda-lime-silica glass-ceramic body 12 may comprise about 50 mol % $SiO_2$, about 17 mol % $Na_2O$, and about 33 mol % CaO. As used herein the term "about" means within 1%.

The presently disclosed soda-lime-silica glass-ceramic body 12 has been found to exhibit suitable chemical, mechanical, and thermal properties without the addition of $Al_2O_3$ and/or MgO, which are conventionally included in soda-lime-silica glass compositions to improve chemical resistance and inhibit the ability of the glass to crystallize. As such, the presently disclosed soda-lime-silica glass-ceramic body 12 may be substantially free of $Al_2O_3$ and/or MgO. In one form, soda-lime-silica glass-ceramic body 12 may include less than 0.9 mol % $Al_2O_3$ and less than 2.2 mol % MgO, and preferably less than 0.6 mol % $Al_2O_3$ and less than 1.0 mol % MgO.

The crystalline phase provides the glass-ceramic body 12 with improved fracture toughness, as compared to fully amorphous materials having similar chemical compositions, and comprises a plurality of crystalline particles homogeneously dispersed throughout the amorphous matrix phase. The crystalline particles in the glass-ceramic body 12 comprise solid solution crystals having a hexagonal crystalline structure substantially identical to that of a stoichiometric $Na_2O.2CaO.3SiO_2$ composition, commonly referred to as combeite. In one form, the crystalline particles may have particle sizes in the range of 0.1 μm to 50 μm, including all ranges and subranges therebetween. Unlike the crystalline phases which typically form during devitrification of conventional soda-lime-silica glass compositions, the crystalline phase of the presently disclosed $NC_2S_3$ glass-ceramic does not include particles of devitrite ($Na_2O.3CaO.6SiO_2$), wollastonite ($CaO.SiO_2$), or of a silica ($SiO_2$) polymorph (i.e., quartz, cristobalite or tridymite).

The crystalline phase of the glass-ceramic body 12 is enriched in sodium (Na) relative to the amorphous matrix phase and relative to a stoichiometric $Na_2O.2CaO.3SiO_2$ composition. This means that, although the structure of the crystalline particles is substantially identical to that of combeite, the sodium content of the crystalline phase is greater than that of a stoichiometric $Na_2O.2CaO.3SiO_2$ composition and also is greater than that of the amorphous matrix phase.

In one form, the crystalline phase may comprise 12-17 at % Na and the amorphous matrix phase may comprise 9 at % to 13 at % Na. By comparison, a conventional soda-lime-silica glass composition generally comprises 8.3 at % to 9.6 at % Na, or, more specifically, 8.6 at % to 9.3 at % Na. The "atomic percent" or "at %" of one kind of atom within a mixture is calculated by dividing the number of atoms of that kind by the total number of atoms within the mixture and multiplying by 100. The sodium content of the crystalline phase will depend upon the degree of crystallization, with the sodium content decreasing as the volume fraction of the crystalline phase increases until the volume fraction reaches unity.

Figure 2:
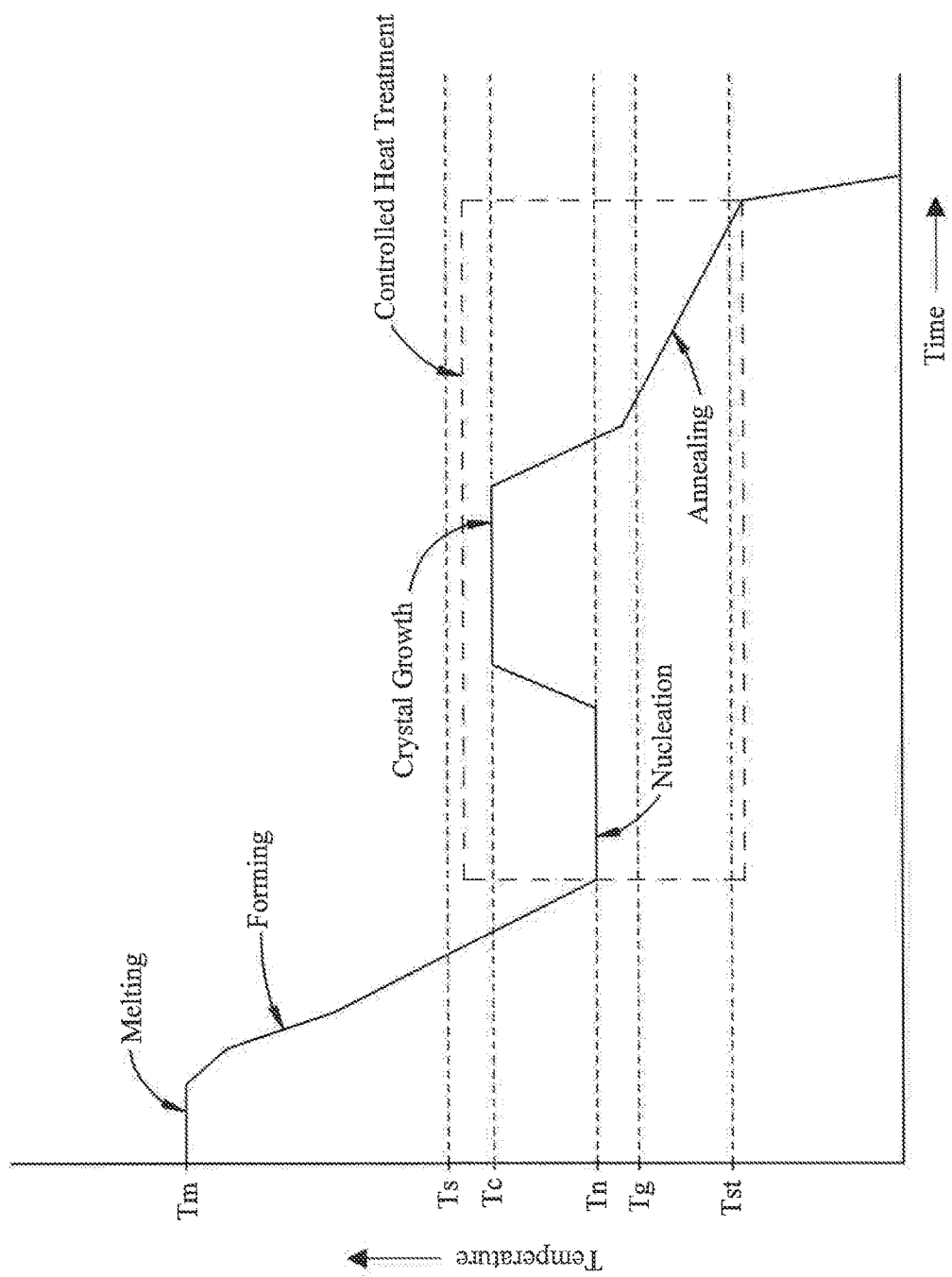
FIG. 2 is a graphical illustration of a thermal treatment schedule for manufacturing a soda-lime-silica glass-ceramic container, in accordance with one embodiment of the present disclosure.

Referring now to FIG. 2, a method of manufacturing a soda-lime-silica glass-ceramic article, such as the glass-ceramic container 10 illustrated in FIG. 1, includes a melting stage, a forming stage, and a thermal treatment stage.

In the melting stage, glass batch materials are melted, for example, in a glass furnace, to produce a thermally crystallizable soda-lime-silica parent glass composition. The parent glass composition is formulated to approximate a stoichiometric $Na_2O.2CaO.3SiO_2$ system and may comprise 47 mol % to 63 mol % $SiO_2$, 15 mol % to 22 mol % $Na_2O$, and 18 mol % to 36 mol % CaO, including all ranges and subranges between these ranges. In some specific embodiments, the mole fraction of $Na_2O$ in the parent glass composition may be greater than or equal to 0.15, 0.16, or 0.165; less than or equal to 0.22, 0.19, or 0.17; or between 0.15-0.22, 0.16-0.19, or 0.165-0.17; the mole fraction of CaO in the parent glass composition may be greater than or equal to 0.18, 0.30, or 0.32; less than or equal to 0.36, 0.35, or 0.34; or between 0.18-0.36, 0.30-0.35, or 0.325-0.34; and the mole fraction of $SiO_2$ in the parent glass composition may be greater than or equal to 0.47, 0.48, or 0.49; less than or equal to 0.63, 0.53, or 0.51; or between 0.47-0.63, 0.48-0.53, or 0.49-0.51. In one form, the parent glass composition may comprise about 50 mol % $SiO_2$, about 17 mol % $Na_2O$, and about 33 mol % CaO.

The parent glass composition may comprise other materials in relatively small amounts, e.g., relatively small amounts of one or more of the following: MgO, $K_2O$, $Fe_2O_3$, $SO_3$, $V_2O_5$, $As_2O_3$, $TiO_2$, carbon, nitrates, flourines, chlorines, or elemental or oxide forms of one or more of selenium, chromium, manganese, cobalt, nickel, copper, niobium, molybdenum, silver, cadmium, indium, tin, gold, cerium, praseodymium, neodymium, europium, gadolinium, erbium, and uranium, to name but a few examples. Such materials may be additives, residual materials from cullet, and/or impurities typical in the commercial glass manufacturing industry. The total amount of all other materials in the parent glass composition may be less than 5.0 mol %, preferably less than 2.0 mol %, and more preferably less than 1.0 mol %.

The parent glass composition may be substantially free of nucleating agents, e.g., $ZrO_2$, $TiO_2$, and/or $P_2O_5$, and may include less than 0.3 mol % thereof. Also, the parent glass composition may be substantially free of $Al_2O_3$ and/or MgO, and may include less than 0.9 mol % $Al_2O_3$ and less than 2.2 mol % MgO.

During the forming stage, an amount of the parent glass composition is formed into a glass body having a container shape. The forming stage is carried out at a temperature below a melting point (Tm), but above a softening point (Ts), of the parent glass composition. The parent glass composition has a melting point in the range of 1100° C.-1400° C. and a softening point in the range of 660° C.-740° C. Compared to conventional $NCS_6$ glass, however, the parent $NC_2S_3$ glass composition has a low viscosity in the molten state and, consequently, is difficult to shear or otherwise consistently partition into pre-weighted gobs due to its high flowability. At 1100° C., for example, the viscosity of $NC_2S_3$ glass is about $10^2$ poise, while at the same temperature the viscosity of $NCS_6$ glass is about $10^4$ poise. Alternative techniques more amenable to forming low viscosity molten materials into defined shapes may have to be used instead. Spin casting and injection molding are two such forming techniques that can be employed to form the parent glass composition into a glass body without bulk crystallizing the glass composition.

In a preferred embodiment of the forming stage, the parent glass composition is formed into the glass body with a container shape by spin casting. During spin casting, a charge of the parent glass composition, which may be at a temperature in the range of 1050° C.-1100° C., is poured into a casting mold through an inlet opening at the top of the mold. The casting mold is spinning on its axis while the parent glass composition charge is being introduced into a container-shaped mold cavity of the casting mold and for a period of time thereafter. The spinning action of the mold and the associated centrifugal force drives the molten parent glass composition outwards and into the container-shaped mold cavity and results in rapid cooling of the glass. Specifically, the parent glass composition is cooled without bulk crystallizing to a temperature of 900° C., or below, which raises the viscosity of the glass enough that it can hold a container shape. Of course, in other embodiments, the parent glass composition can be rapidly cooled without bulk crystallizing through the entire crystallization zone and ultimately below the softening point of the glass. In either scenario, the glass body is obtained in an amorphous state despite the initially low viscosity of the parent glass composition melt and the overlap of the forming and crystallization temperature ranges of $NC_2S_3$ glass.

After the forming stage, the glass body may be transferred to the thermal treatment stage, which may be carried out in an oven or lehr. The thermal treatment stage may be performed according to a predetermined schedule and may be considered to involve three different stages: nucleation, crystal growth, and annealing, all of which may occur at the same or different times during manufacture of the soda-lime-silica glass-ceramic article.

During the nucleation stage, the glass body is brought to a temperature within a predetermined temperature range at which nuclei are known to form spontaneously and homogeneously throughout a bulk of the parent glass. This may include cooling the glass body after the forming stage to a temperature below the softening point, but above a glass transition temperature (Tg) of the parent glass composition. In other embodiments, where the glass body is cooled to a temperature below the glass transition temperature of the parent glass after the forming stage, the glass body may need to be re-heated to a temperature above the glass transition temperature, but below the softening point of the parent glass composition. Thereafter, the glass body may be maintained within this temperature range for a sufficient amount of time for bulk nucleation to occur throughout the glass body. In one form, the parent glass composition may have a softening point in the range of 660° C.-740° C. and a glass transition temperature in the range of 560° C.-585° C. In such case, homogeneous nucleation may be carried out at a temperature in the range of 525° C.-625° C. for a time between 10 minutes and 180 minutes. In one specific example, homogeneous nucleation may be carried out at a temperature in the range of 580° C.-610° C. for a time between 5 minutes to 30 minutes. The temperature at which the nucleation stage is carried out may be adjusted to coincide with the temperature at which the nucleation rate of the parent glass composition reaches a maximum (Tn), i.e., 600° C.

During the crystal growth stage, the nucleated glass body is brought to a temperature within a predetermined temperature range at which crystal growth is known to occur on pre-existing nuclei in the parent glass. As the crystals grow within the parent glass, the glass body is transformed into a glass-ceramic body. The crystal growth stage is carried out at a temperature below the softening point, but above the glass transition temperature of the parent glass composition, albeit closer to the softening point. And, in general, the crystal growth stage will be carried out at a higher temperature than that of the nucleation stage. The temperature at which the crystal growth stage is carried out may be adjusted to coincide with the temperature at which the rate of crystal growth within the parent glass composition reaches a maximum (Tc), i.e., about 720° C. After the glass body is brought to a suitable temperature for crystal growth, the glass body is maintained at such temperature or within a suitable temperature range for a sufficient amount of time for a desired amount of crystal growth to occur on the pre-existing nuclei in the parent glass. In one form, crystal growth may be carried out at a temperature in the range of 600-750° C. for a time between 10 minutes and 120 minutes. In one specific example, the crystal growth stage may be carried out at a temperature in the range of 680° C.-730° C. for a time between one minute and 30 minutes.

The temperature and duration of the crystal growth stage may be controlled or adjusted so that the crystalline phase in the resulting glass-ceramic body reaches a target volume fraction and so that the crystalline particles reach a desired mean particle size. In general, longer heating times will result in glass-ceramic bodies having a higher degree of crystallization and larger crystalline particles. Suitable adjustment of the crystal particle size and the degree of crystallization may allow for the production of glass-ceramic bodies having a range of desired mechanical, optical, chemical, and thermal properties. For example, a greater volume of crystals leads to more opacity and a shift in the UV absorption edge of the $NC_2S_3$ glass-ceramic as well as greater chemical durability. Additionally, a greater volume of smaller sized crystals, such as crystals having a particle size of less than 20 μm, can positively influence the strength and fracture toughness of the $NC_2S_3$ glass-ceramic by acting as crack deflectors that deflect cracks, to the extent they form and propagate, along a non-preferred path.

In some embodiments, nucleation and crystal growth may be performed at substantially the same time and at substantially the same temperature. In such case, nucleation and crystal growth may be performed by bringing the glass body to a temperature within a predetermined temperature range at which both homogeneous nucleation and crystal growth are known to occur in the parent glass, and then maintaining the glass body within this temperature range for a sufficient amount of time for a desired amount of crystal growth to occur. In one form, both nucleation and crystal growth may be carried out at a temperature in the range of 600° C.-625° C. for a time between 5 minutes and 60 minutes.

After the glass-ceramic body has reached a desired degree of crystallization, the glass-ceramic body may be annealed, for example, according to an annealing schedule. This may include gradually lowering the temperature of the glass-ceramic body from a temperature at or above the glass transition temperature of the glass to a temperature below a strain point (Tst) of the glass. In one form, the amorphous matrix phase or glassy portion of the glass-ceramic body may have an annealing point in the range of 545° C.-585° C. and a strain point in the range of 520° C.-560° C. In such case, annealing of the glass-ceramic body may be carried out at a temperature in the range of 540° C.-580° C. for a time between 5 minutes and 25 minutes. After the glass-ceramic body is annealed, the glass-ceramic body is cooled to room temperature at as sufficient rate to prevent thermal cracking.

EXAMPLES

Several soda-lime-silica glass and soda-lime-silica glass-ceramic samples were prepared in a laboratory and analyzed with respect to their structural, chemical, and optical properties.

Example 1

A thermally-crystallizable soda-lime-silica glass having a stoichiometric $Na_2O.2CaO.3SiO_2$ glass composition ($NC_2S_3$) was prepared by melting a mixture of soda ash, limestone, and sand in platinum crucibles in a Deltech furnace at 1450° C. for three hours. Specifically, the mixture included 76.26 g of soda ash ($Na_2CO_3$), 144.04 g limestone ($CaCO_3$), and 129.7 g sand ($SiO_2$). Samples of the molten $NC_2S_3$ glass were cast between steel plates and re-melted for 30 minutes to promote homogeneity. The glass samples were then poured and re-cast between steel plates. Differential scanning calorimetry (DSC) was performed on several of the $NC_2S_3$ glass samples. The DSC data revealed a crystallization peak temperature of 720° C. for the $NC_2S_3$ glass.

Example 2

Several of the $NC_2S_3$ glass samples prepared in Example 1 were thermally treated by being heated at a temperature of 720° C. for 30, 60, 90, or 120 minutes to transform the glass samples into glass-ceramics. The glass-ceramic samples were then cooled to room temperature, either at a rate of 3-4° C. per minute or 1-2° C. per minute. The crystalline volume fraction and opacity of the glass-ceramic samples were observed and were found to increase with increasing heating time. In addition, the slower cooling rate of 1-2° C. per minute was found to produce a higher degree of crystallization than the faster cooling rate of 3-4° C. per minute. A thermal treatment time of 30 minutes at 720° C. resulted in glass-ceramic samples having a crystalline volume fraction in the range of 0.20-0.50.

Figure 3:
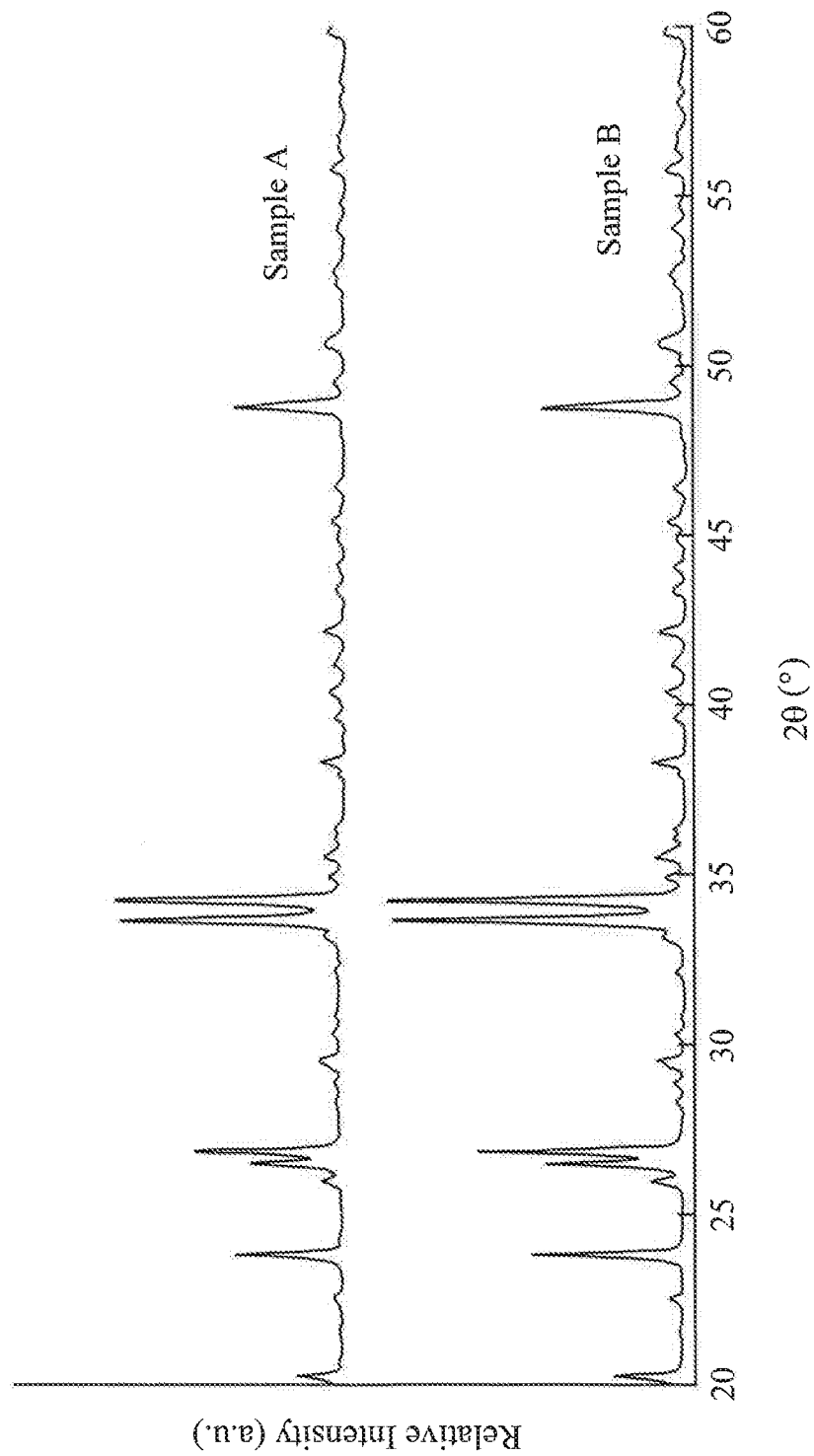
FIG. 3 illustrates x-ray diffraction patterns of two stoichiometric $Na_2O.2CaO.3SiO_2$ glass-ceramic samples having different degrees of crystallization.

Referring now to FIG. 3, x-ray diffraction (XRD) was performed on a $NC_2S_3$ glass-ceramic sample heat treated at 720° C. for 30 minutes and cooled at a rate of 3-4° C. per minute (Sample A) and a $NC_2S_3$ glass-ceramic sample that was heat treated at 720° C. for 30 minutes and cooled at a rate of 1-2° C. per minute (Sample B). Sample A had a crystalline volume fraction in the range of 0.20-0.40 and Sample B had a crystalline volume fraction of greater than 0.80. The x-ray powder diffraction peak positions (degrees 2θ) and relative intensities of Sample A and Sample B are illustrated in FIG. 3. All diffraction peak positions of Sample A and Sample B were analyzed using JADE peak fitting software and indicate the presence of a combeite crystal phase ($Na_2Ca_2Si_3O_9$). No secondary crystal phases were observed in either of the Samples.

As shown in FIG. 3, the most pronounced diffraction peak (using a Cu $K_{\alpha 1}$ source) positions and relative intensities of the combeite crystal phase are located at the following 2θ: 33.62° (100%), 34.25° (98%), 26.87° (62%), 48.75° (59%), and 23.82° (33). In comparison, XRD data of devitrified conventional $NCS_6$ glass would show the presence of other crystal phases such as devitrite, wollastonite, or a silica polymore such as cristobalite, none of which were detected in Samples A and B. To be sure, the three dominant diffraction peak positions of devitrite (26.98°, 29.87°, and 28.66°), wollastonite (26.88°, 23.20°, and 25.28°), and cristobalite (23.64°, 34.24°, and 38.42°) are not present in the XRD patterns of FIG. 3.

Scanning electron microscopy (SEM) indicates that the crystalline particles in the glass-ceramic samples exhibit spherical crystal morphology (spherical shapes) based on the hexagonal structure of combeite.

Example 3

Several of the $NC_2S_3$ glass-ceramic samples prepared in Example 2 were fractured to reveal a fresh surface from within the bulk sample and then sputter coated with a thin layer of gold. Energy dispersive spectroscopy (EDS) was performed on cross-sections or fracture surfaces of the $NC_2S_3$ glass-ceramic samples. In general, the EDS data revealed a higher concentration of sodium (Na) in the crystalline phase of the glass-ceramic samples than in the surrounding amorphous matrix phase. In one particular glass-ceramic sample heated at 720° C. for 30 minutes and having approximately 30 vol %-50 vol % crystallinity, EDS data was taken from six different points along a fracture surface of the sample, with three of the points taken from different crystalline particles and the remaining three points taken from the surrounding glass (i.e., the amorphous matrix phase). Based upon the resulting EDS data, the composition of each of the six points was calculated, as shown in Table 1 below.

TABLE 1

| Point | O (atom %) | Na (atom %) | Si (atom %) | Ca (atom %) |
|---|---|---|---|---|
| 1 (Glass) | 56.2 | 10.1 | 17.5 | 16.1 |
| 2 (Glass) | 56.2 | 10.4 | 17.7 | 15.7 |
| 3 (Glass) | 56.4 | 9.9 | 17.7 | 16.0 |
| 4 (Glass) | 56.3 | 10.2 | 17.7 | 15.8 |
| 5 (Glass) | 56.3 | 10.0 | 17.5 | 16.2 |
| 6 (Crystal) | 56.0 | 11.4 | 17.7 | 14.9 |
| 7 (Crystal) | 56.1 | 11.7 | 18.0 | 14.2 |
| 8 (Crystal) | 55.9 | 11.8 | 17.6 | 14.8 |
| 9 (Crystal) | 55.8 | 11.3 | 17.1 | 15.9 |
| 10 (Crystal) | 55.8 | 11.4 | 17.3 | 15.5 |

Example 4

Several of the $NC_2S_3$ glass and glass-ceramic samples prepared in Examples 1 and 2 were ground into particles having particle sizes in the range of 297 µm to 420 µm. The hydrolytic resistance of these $NC_2S_3$ glass and glass-ceramic particles was assessed using the Glass Grains Test set forth in USP <660>"Containers—Glass," wherein 10 grams of the glass grains are autoclaved in 50 mL of carbon dioxide-free purified water for 30 minutes at 121° C. The leachable quantity of alkali metal ions (e.g., $Na^+$) per gram of glass grains was calculated based upon the amount of 0.02M HCl needed to bring the test solutions to neutral pH.

For comparison, the Glass Grains Test was performed on a stoichiometric $1Na_2O.1CaO.6SiO_2$ glass composition ($NCS_6$) including 75.33 wt % $SiO_2$, 12.95 wt % $Na_2O$, and 11.72 wt % CaO, as well as a commercial container glass composition including 72.49 wt % $SiO_2$, 13.46 wt % $Na_2O$, 10.47 wt % CaO, 1.32 wt % $Al_2O_3$, 1.68 wt % MgO, 0.19 wt % $K_2O$, and 0.23 wt % $SO_3$. In addition, the Glass Grains Test was performed on a sample of the same commercial container glass composition after grains of the glass were sintered and crystallized at 750° C. for 24 hours to produce a partially crystalline glass-ceramic.

The results of the Glass Grains Test are set forth in Table 2 below. The amount of 0.02M HCl required to titrate the test solutions to a neutral pH was then converted to an equivalent mass of $Na_2O$ extracted from the sample grains and reported in µg $Na_2O$ per gram of sample grains, with smaller values indicative of greater hydrolytic resistance or chemical durability.

TABLE 2

| Test No. | Composition | Volume Fraction Crystallized | Replicate No. | Amt. of 0.02M HCl consumed per gram of sample grains (mL/g) | Equiv. mass of $Na_2O$ extracted from sample grains (µg/g) | Moles of titrated Na per gram of glass (moles/g) |
|---|---|---|---|---|---|---|
| 1 | $NC_2S_3$ | None | 1 | 0.94 | 583 | $1.88 \times 10^{-5}$ |
| 2 | $NC_2S_3$ | None | 2 | 0.93 | 576 | $1.86 \times 10^{-5}$ |
| 3 | $NC_2S_3$ | 0.2-0.4 | 1 | 0.75 | 465 | $1.50 \times 10^{-5}$ |
| 4 | $NC_2S_3$ | 0.2-0.4 | 2 | 0.76 | 471 | $1.52 \times 10^{-5}$ |
| 5 | $NC_2S_3$ | >0.8 | 1 | 0.58 | 359 | $1.16 \times 10^{-5}$ |
| 6 | $NC_2S_3$ | >0.8 | 2 | 0.58 | 359 | $1.16 \times 10^{-5}$ |
| 7 | $NCS_6$ | None | 1 | 0.76 | 471 | $1.52 \times 10^{-5}$ |
| 8 | $NCS_6$ | None | 2 | 0.75 | 465 | $1.50 \times 10^{-5}$ |
| 9 | Container Glass | None | 1 | 0.62 | 384 | $1.24 \times 10^{-5}$ |
| 10 | Container Glass | None | 2 | 0.61 | 378 | $1.22 \times 10^{-5}$ |
| 11 | Container Glass | 0.2-0.4 | 1 | 3.00 | 1859 | $6.00 \times 10^{-5}$ |
| 12 | Container Glass | 0.2-0.4 | 2 | 2.97 | 1841 | $5.94 \times 10^{-5}$ |

As shown in Table 2, partially crystallized $NC_2S_3$ glass-ceramic compositions exhibit greater chemical resistance than amorphous $NC_2S_3$ glass compositions (Test Nos. 3-6 vs. Test Nos. 1-2). And the chemical resistance of partially crystallized $NC_2S_3$ glass-ceramic compositions increases with increasing degrees of crystallization (Test Nos. 3-4 vs. Test Nos. 5-6). Notably, an exceptional level of chemical resistance was observed in the partially crystallized $NC_2S_3$ glass-ceramic samples, without addition of $Al_2O_3$. Also, an amorphous commercial container glass composition including 1.3 wt % $Al_2O_3$ exhibits greater chemical resistance than an amorphous $NCS_6$ glass composition that does not include $Al_2O_3$ (Test Nos. 9-10 vs. Test Nos. 7-8). Further, partial crystallization of a commercial container glass composition significantly reduces the chemical resistance of the composition (Test Nos. 9-10 vs. Test Nos. 11-12).

Example 5

Figure 4:
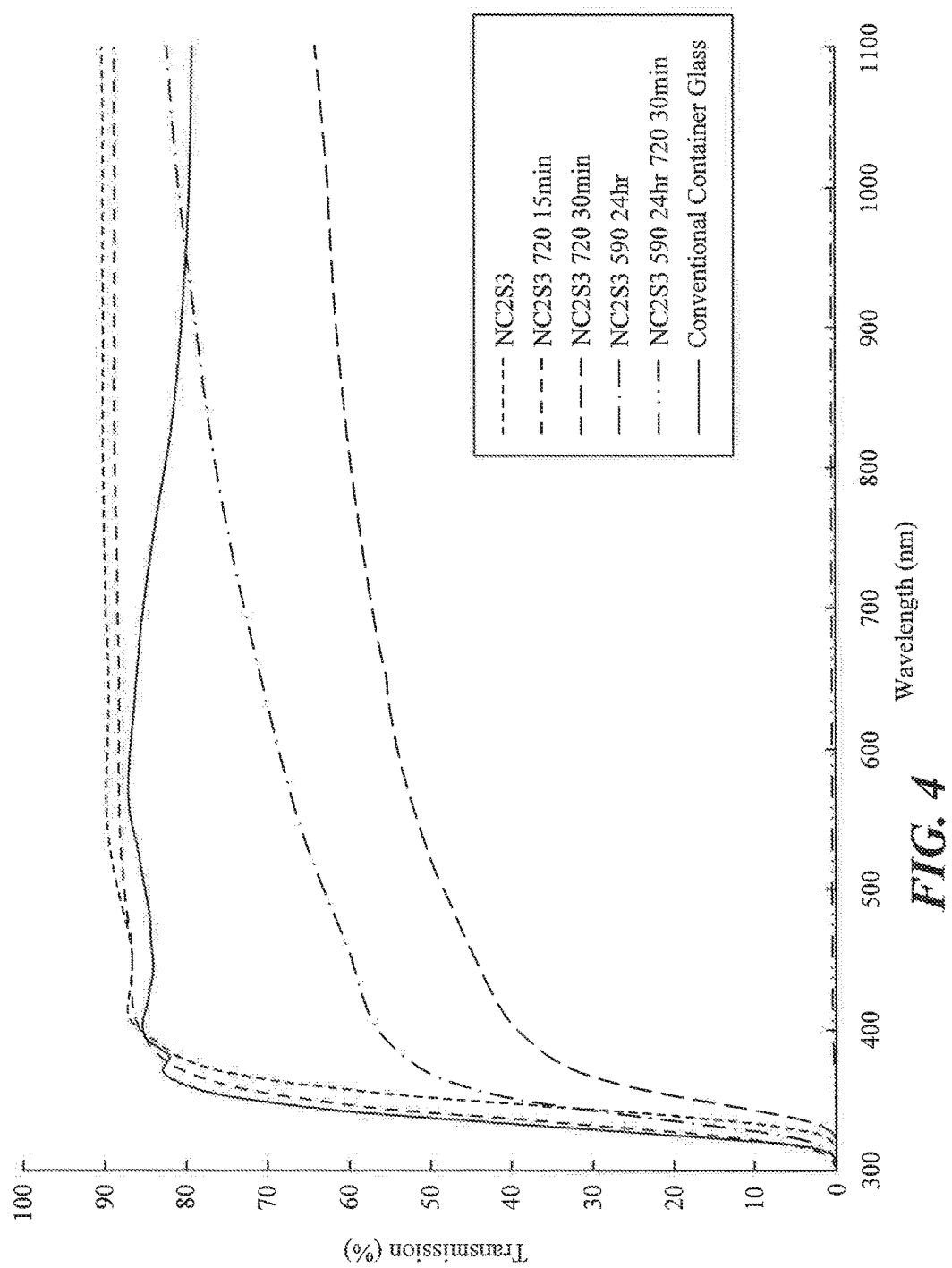
FIG. 4 is a graphical plot of light transmission through samples of conventional flint container glass, stoichiometric $Na_2O.2CaO.3SiO_2$ glass, and partially and fully crystallized $Na_2O.2CaO.3SiO_2$ glass-ceramics.

The optical properties of several of the $NC_2S_3$ glass and glass-ceramic samples prepared in Examples 1 and 2 were analyzed, along with a sample of a commercial flint container glass composition including 72.49 wt % $SiO_2$, 13.46 wt % $Na_2O$, 10.47 wt % CaO, 1.32 wt % $Al_2O_3$, 1.68 wt % MgO, 0.19 wt % $K_2O$, and 0.23 wt % $SO_3$. FIG. 4 illustrates plots of Transmission (%) vs. Wavelength (nm) through the following samples: (1) an amorphous $NC_2S_3$ glass composition, (2) a $NC_2S_3$ glass-ceramic composition prepared by thermal treatment at 720° C. for 15 minutes, (3) a $NC_2S_3$ glass-ceramic composition prepared by thermal treatment at 720° C. for 30 minutes, (4) a $NC_2S_3$ glass-ceramic composition prepared by thermal treatment at 590° C. for 24 hours, (5) a $NC_2S_3$ glass-ceramic composition prepared by thermal treatment at 590° C. for 24 hours followed by 720° C. for 30 minutes, and (6) an amorphous commercial flint container glass composition. Further details of the chemical, structural, and optical properties of these samples are set forth in Table 3 below.

TABLE 3

| Sample No. | Composition | Thermal treatment | Volume Fraction Crystallized | Crystal Size (μm) | Trans. at 400 nm (%) | Trans. at 550 nm (%) | Appearance |
|---|---|---|---|---|---|---|---|
| 1 | NC$_2$S$_3$ | None | None | None | 85.9 | 89.7 | Transparent |
| 2 | NC$_2$S$_3$ | 720° C., 15 min. | <5% | 5-15 | 85.8 | 88.2 | Translucent |
| 3 | NC$_2$S$_3$ | 720° C., 30 min. | 30-50% | 20-50 | 39.4 | 51.8 | Transluncent |
| 4 | NC$_2$S$_3$ | 590° C., 24 hr. | 5-10% | 1-5 | 56.4 | 66.2 | Transparent |
| 5 | NC$_2$S$_3$ | 720° C., 15 min. + 590° C., 24 hr. | >90% | 1-10 | 0.3 | 0.4 | Opaque |
| 6 | Flint Container | None | None | None | 85.4 | 86.8 | Transparent |

There thus has been disclosed a soda-lime-silica glass-ceramic article and a method of manufacturing a soda-lime-silica glass-ceramic article that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of manufacturing a soda-lime-silica glass-ceramic container comprising:
    forming a glass body from a parent glass composition comprising 47-63 mol % SiO$_2$, 15-22 mol % Na$_2$O, and 18-36 mol % CaO, the glass body being in the shape of a container; and
    subjecting the glass body to a thermal treatment schedule to promote bulk in situ crystallization of the glass body such that the glass body is transformed into a glass-ceramic body having an amorphous matrix phase and a crystalline phase homogeneously dispersed throughout the amorphous matrix phase, the crystalline phase comprising combeite crystalline particles.

2. The method set forth in claim 1, wherein the thermal treatment schedule comprises:
    a nucleation stage wherein the glass body is brought to a temperature in a range of 525° C.-625° C. and maintained within the range of 525° C.-625° C. for 10 minutes to 180 minutes such that a plurality of nuclei spontaneously form within the glass body; and
    a crystal growth stage wherein the glass body is brought to a temperature in a range of 600° C.-750° C. and maintained within the range of 600° C.-750° C. for 10 minutes to 120 minutes such that a plurality of crystalline particles form on the pre-existing nuclei.

3. The method set forth in claim 1, wherein, during the crystal growth stage, the glass body is maintained at a temperature in a range of 600° C.-750° C. for an amount of time to transform the glass body into a glass-ceramic body having a crystalline volume fraction in the range of 0.10 to 0.70.

4. A method of manufacturing a soda-lime-silica glass-ceramic container comprising:
    forming a glass body from a parent glass composition comprising 47-63 mol % SiO$_2$, 15-22 mol % Na$_2$O, and 18-36 mol % CaO, the glass body being in the shape of a container; and
    subjecting the glass body to a thermal treatment schedule to promote bulk in situ crystallization of the glass body such that the glass body is transformed into a glass-ceramic body having an amorphous matrix phase and a crystalline phase homogeneously dispersed throughout the amorphous matrix phase, wherein the glass body is not cooled to a temperature below a glass transition temperature of the parent glass composition prior to being subjected to the thermal treatment schedule.

5. The method set forth in claim 1, wherein the thermal treatment schedule comprises:
    a combined nucleation and crystal growth stage, wherein the glass body is brought to a temperature in a range of 600° C.-750° C. and maintained within said range for 10 minutes to 180 minutes.

6. The method set forth in claim 1, wherein the thermal treatment schedule comprises:
    an annealing stage, wherein the glass-ceramic body is gradually cooled to a temperature below a strain point of the amorphous matrix phase to reduce internal stresses within the glass-ceramic body.

7. A method of manufacturing a soda-lime-silica glass-ceramic container comprising:
    forming a glass body from a parent glass composition comprising 47-63 mol % SiO$_2$, 15-22 mol % Na$_2$O, and 18-36 mol % CaO, the glass body being in the shape of a container;
    maintaining the glass body at a temperature between 525° C. and 600° C. to form nuclei spontaneously and homogeneously throughout the glass body;
    maintaining the glass body at a temperature between 600° C. and 750° C. to grow crystals on the nuclei throughout the glass body and thereby transform the glass body into a glass-ceramic body; and
    annealing the glass-ceramic body at a temperature between 540° C. and 580° C. followed by cooling the glass-ceramic body to a temperature below a strain point of the amorphous glass matrix of the glass-ceramic body to reduce internal stresses within the glass-ceramic body.

8. The method set forth in claim 7, wherein the glass body is not cooled to a temperature below the glass transition temperature of the parent glass composition prior to maintaining the glass body at a temperature between 525° C. and 600° C. to form nuclei spontaneously and homogeneously throughout the glass body.

9. The method set forth in claim 7, wherein the glass-ceramic body comprises combeite crystalline particles homogeneously dispersed within an amorphous glass matrix, and wherein the glass-ceramic body does not include particles of devitrite (Na$_2$O.3CaO.6SiO$_2$), wollastonite (CaO.SiO$_2$), or a SiO$_2$ polymorph.

10. The method set forth in claim 7, wherein the glass body is maintained at a temperature between 580° C. and 610° C. to form nuclei, and wherein the glass body is further maintained at a temperature between 680° C. and 730° C. to grow crystals on the nuclei.

* * * * *